United States Patent
Aoyama

(10) Patent No.: US 6,267,439 B1
(45) Date of Patent: Jul. 31, 2001

(54) FITTING STRUCTURE OF ARMOR MEMBER FOR VEHICLE

(75) Inventor: Tadatoshi Aoyama, Niiza (JP)

(73) Assignee: Honda Access Sales Corp., Saitama (JP)

( * ) Notice: Subject to any disclaimer, the term of this patent is extended or adjusted under 35 U.S.C. 154(b) by 0 days.

(21) Appl. No.: 09/114,156

(22) Filed: Jul. 13, 1998

(51) Int. Cl.[7] .................................................. B62D 25/02
(52) U.S. Cl. .......................................... 296/203.3; 296/29
(58) Field of Search ...................... 89/36.08; 296/203.02, 296/203.03, 203.04, 205, 204, 209, 29, 30, 36, 37.7

(56) References Cited

U.S. PATENT DOCUMENTS

| | | | |
|---|---|---|---|
| 3,884,516 | * | 5/1975 | Gallion et al. ........................ 293/117 |
| 4,440,434 | * | 4/1984 | Celli ..................................... 296/185 |
| 4,973,103 | * | 11/1990 | Imajyo et al. ........................ 296/195 |
| 5,288,121 | * | 2/1994 | Graves ................................. 296/209 |
| 5,385,377 | * | 1/1995 | Girard ................................... 296/36 |
| 5,575,526 | * | 11/1996 | Wycech ................................. 296/205 |
| 5,806,919 | * | 9/1998 | Davies ............................. 296/203.01 |
| 6,102,473 | * | 8/2000 | Steininger et al. ................... 296/209 |

FOREIGN PATENT DOCUMENTS

| | | |
|---|---|---|
| 6-359082 | 4/1988 | (JP) . |
| 4-122285 | 11/1992 | (JP) . |

* cited by examiner

Primary Examiner—Stephen M. Johnson
(74) Attorney, Agent, or Firm—Birch, Stewart, Kolasch & Birch, LLP

(57) ABSTRACT

A spoiler is attached to a decorative covering member of a vehicle. The decorative covering member has a first C-shaped cross section opening toward a center of the vehicle. The covering member is located adjacent to a portion of a body of the vehicle and attached to the vehicle by a bracket. The spoiler has a second C-shaped cross section opening toward the center of the vehicle and sized to overlay the first C-shaped cross section of the covering member. A space is formed between the covering member and the portion of the body by inserting a portion of the spoiler into the space while deforming the bracket. The spoiler is attached to the covering member using double-sided adhesive tape and nut and bolt combinations.

20 Claims, 4 Drawing Sheets

FITTING STRUCTURE OF ARMOR MEMBER FOR VEHICLE

BACKGROUND OF THE INVENTION

1. Field of the Invention

The present invention relates to a structure for fitting an armor member such as a side spoiler to a vehicle body of an automobile.

2. Description of the Prior Art

Japanese Laid-Open Utility Model Publication Sho63-59082 (59082/1988) discloses a structure for fitting a resin side spoiler to a side sill of an automobile body with a bolt. Said bolt is to be put into a boss which opens to outer lateral surface of a side spoiler which is integrally formed beforehand, and then to be fastened to the automobile body. Furthermore, Japanese Laid-open Utility Model Publication Hei4-122285 (122285/1992) discloses a structure having a rib formed integrally in order to reinforce the fitting part of such resin side spoiler.

Such a side spoiler is desired to have improved aerodynamic characteristic and the appearance of the fitting part not to be externally viewed, so as to perform a great role for the improvement of appearance.

Furthermore, as the said part is provided on the stepping in and out part, it is required to have a certain extent of rigidity, for which purpose relatively thick wall resin is required to be used with proportional increase in weight. Accordingly, it is desirable to make the resin to be used as thin wall as possible.

Moreover, depending on the kind of automobile, there may be fitted a side sill cover in advance as a decorative member having a certain degree of rigidity. In such a case, the side sill cover is required to be removed, with additional steps of work required. Furthermore, the step of disposal after removal is required, and disposal itself means uneconomical. It is an object of the present invention to settle these problems.

SUMMARY OF THE INVENTION

In order to dissolve the above problems, the present invention is characterized in that, in a vehicle in which a decorative covering member is previously fitted to a part of a vehicle body and the covering member and a part of the vehicle body are brought into contact with each other in an appearance face, the covering member is provided with a resin armor member, a space being formed between the whole covering member and the vehicle body by forcing a part of the armor member to a part of the area of contact between the covering member and the vehicle body, and the said member is fitted to the other part of the armor member.

In this case, the above covering member may be a side sill cover, and the armor member be a side spoiler, so that the forward and backward ends of the side spoiler be pushed in to each connecting part between the forward and backward ends of the side sill cover and the front fender and rear fender.

According to the present invention, when a part of the armor member is pushed into a part of the area of contact between the covering member and the vehicle body in the appearance face, a space is formed between the whole covering member and the vehicle body. Therefore, by inserting other part of the armor member by utilizing this space, the armor member can be fitted without marring the appearance.

Moreover, as the armor member is applied over the covering member which is previously fitted to the vehicle body, the armor member is allowed to utilize the rigidity of the covering member, and the armor member does not much necessitate rigidity. Accordingly, it is possible to make the resin armor member as thin as possible, thereby serving to make the whole member lightweight, so that it may be manufactured at a low cost using a simple forming method such as vacuum molding.

Moreover, as the covering member which is previously fitted to the vehicle body side is utilized as it is, it is unnecessary to remove such member, and the work step for removal can be made unnecessary. As a result, it is also unnecessary to make disposal of the removed covering member, and wasting of resource can be prevented.

Moreover, when a side sill cover is used as a covering member and a side spoiler as an armor member, by pushing in the two ends of the side spoiler in the lengthwise direction to the contact part between the two ends of the side sill cover in the lengthwise direction and the fender, the whole side sill cover is pushed down, so that the intermediate part of the side spoiler can be fitted by insertion into the space between the side sill cover and the lower end of the door formed by this pushing down. Accordingly, it is possible to fit the side spoiler easily and in good appearance, and moreover to utilize the side sill cover which is a rigid member.

DETAILED DESCRIPTION OF THE PREFERRED EMBODIMENT

Figure 1:
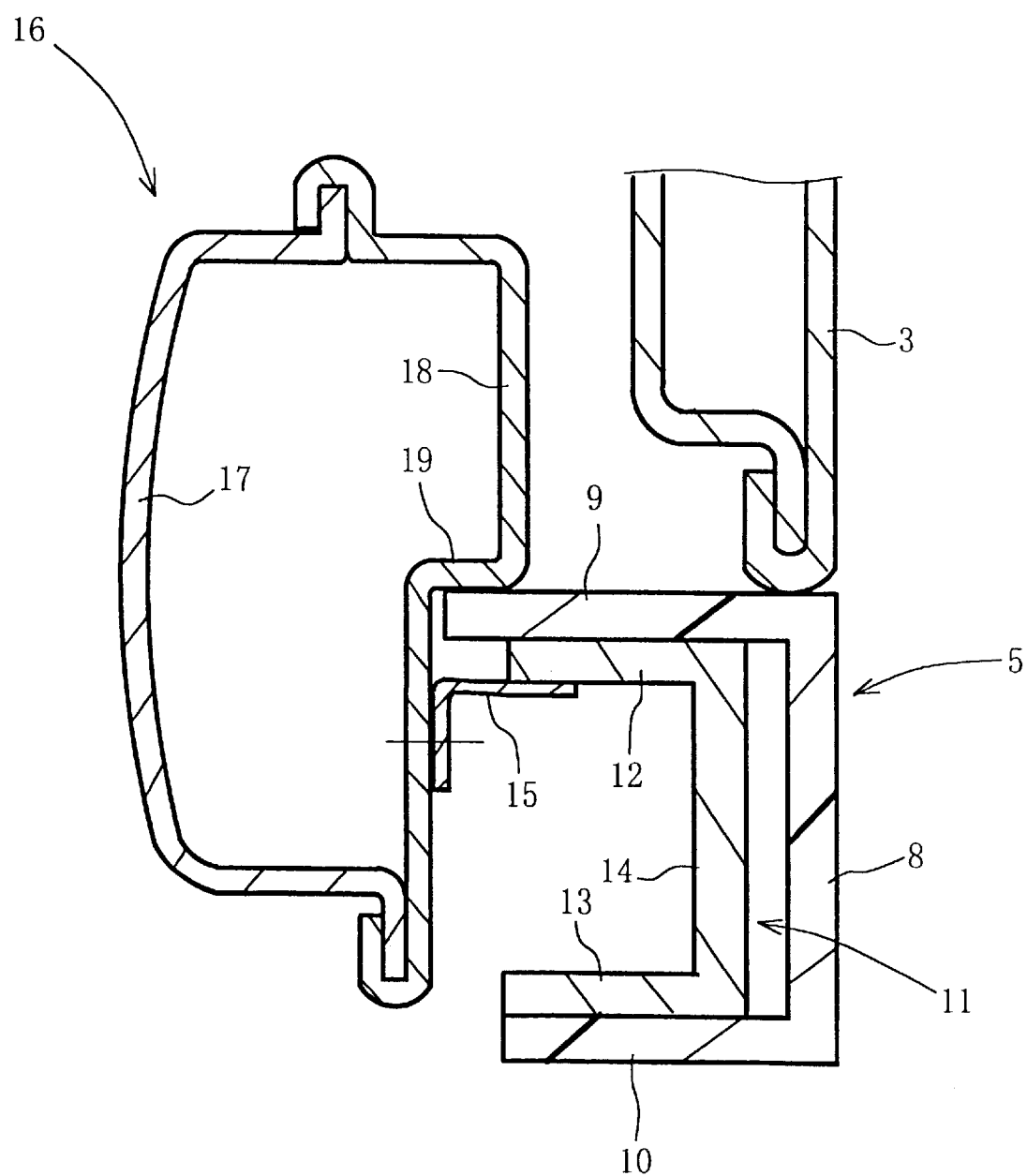
FIG. 1 is a section taken along the line 1—1 in FIG. 2.

A preferred embodiment of the present invention applied to an automobile will be illustrated with reference to the drawings. FIG. 1 is a view to show the fitting condition of the side spoiler which is an armor member as a section of the line 1—1 in FIG. 2.

Figure 2:
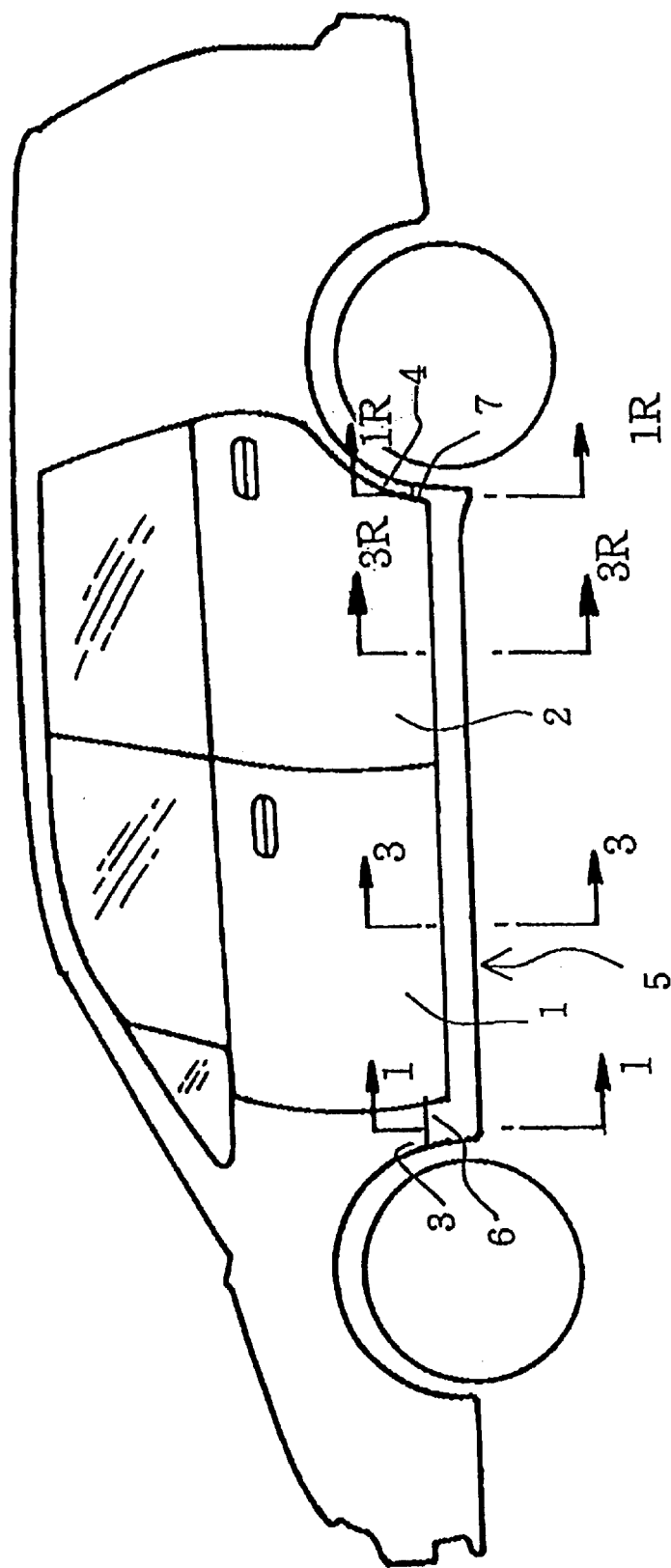
FIG. 2 is a schematic side view of an automobile to which the present invention is applied.

As shown in FIG. 2, on the lateral side of the vehicle body under each of the front door 1 and the rear door 2, there is fitted a long length side spoiler 5 over the spot between the lower part of the rear end of the front fender 3 and the lower part of the front end of the rear fender 4.

The two end parts of the side spoiler 5 in the forward and rearward directions show the front side step 6 and the rear side step 7 which are higher by one step, and are in contact with the lower part of the rear end of the front fender 3 and the lower part of the front end of the rear fender 4, respectively. The intermediate part between the front side step 6 and the rear side step 7 are in contact with the lower parts of the front door 1 and the rear door 2, respectively.

Figure 3:
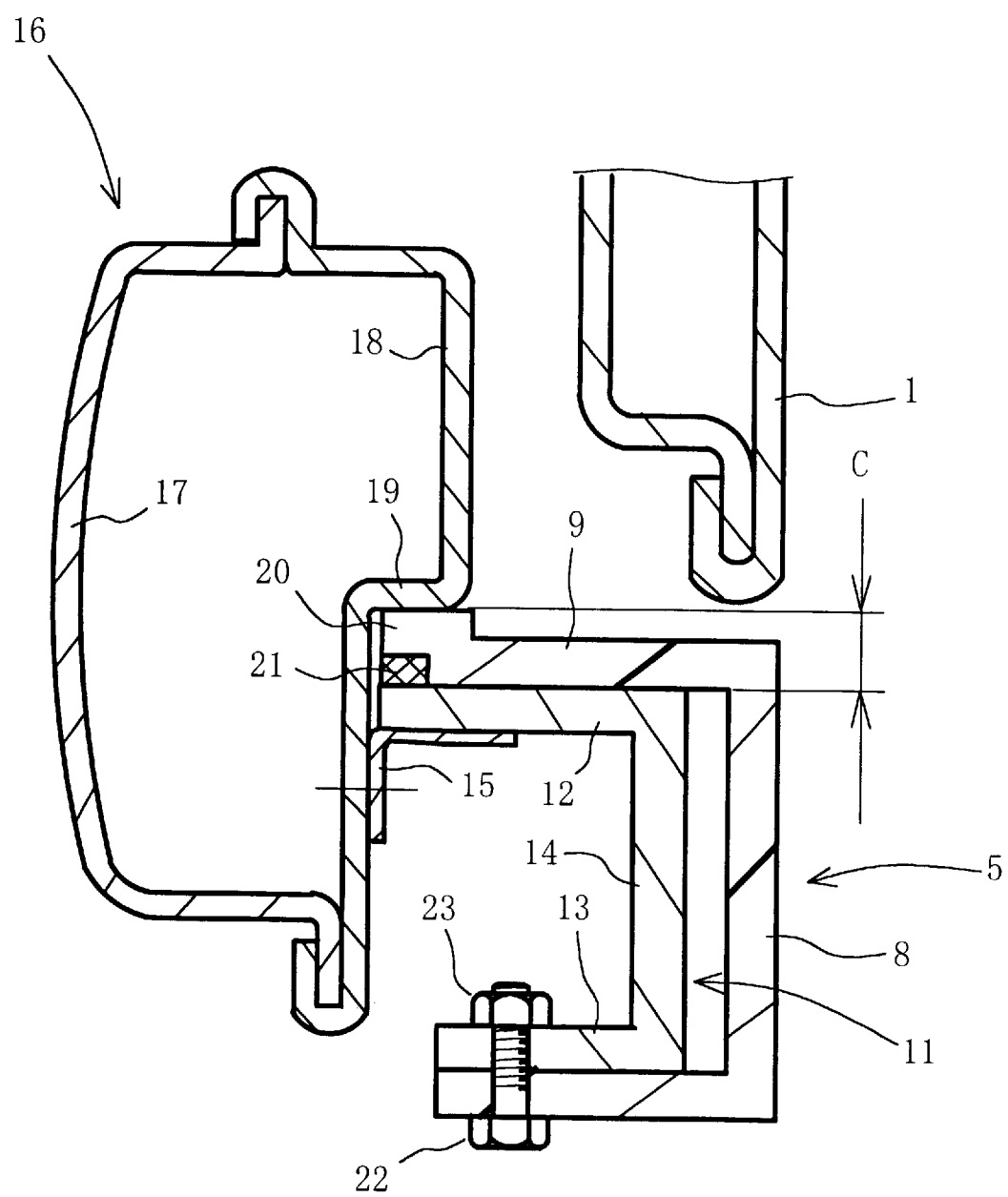
FIG. 3 is a section taken along the line 3—3 in FIG. 2.

The side spoiler 5 is a known member to be used for the purpose of improving the aerodynamic characteristics and the appearance at the lower part of the vehicle body, and as apparent in FIG. 1 and FIG. 3, it shows approximately a shape of one-side lacking square in cross section with opening provided towards the inside of the vehicle body, and is furnished with a lateral side 8 which becomes the main appearance face and the upper side 9 and lower side 10 which are bent from the upper part and the lower part and extend approximately horizontally inward.

The side spoiler 5 is of lightweight and low priced one as being obtained by vacuum forming a relatively thin wall polypropylene resin or the like (e.g., about 2–3 mm). However, this forming method is optional, and various other known forming methods can be applied. Also, as for the resin material, various thermoplastic resins can be used in the same manner.

FIG. 1 shows a fitting structure in the front side step 6. The front side step 6 is covered on the outside of the side sill cover 11 which has a cross-sectional shape of approximately one-side lacking square pattern which is smaller by a size. The side sill cover 11 is a member for decorative use, which is formed of appropriate metal material having rigidity to some extent such as iron, and its upper side part 12 is laid on the underside of the upper side part 9 of the side spoiler 5 to support the former. The lower side part 13 of the side sill cover 11 is also laid on the lower side part 10 of the side spoiler 5. Reference numeral 14 indicates the lateral side of the side sill cover 11.

The side sill cover 11 is previously fitted to a side sill 16 which is a vehicle body constituting member with an appropriate combining member such as a fastener, through a bracket 15 having an approximately L-shaped cross section, at the time of assembling the vehicle body.

The side sill 16 is a box shaped known member comprising an inner plate 17 and an outer plate 18. The outer plate 18 extends outside the vehicle body on its upper part, and a step 19 is formed with the lower side part thereof.

Between the lower surface of the step 19 and the upper side 12 of the side sill cover 11, the tip of the upper side 9 of the front side step 6 is pushed in, by which the side sill cover 11 causes to deform the bracket 15 to push it down by approximately the wall thickness of the upper side part 9. Under this condition, the upper side part 9 of the front side step 6 is in close contact with the lower end part of the front fender 3.

The bracket 15 is formed with an appropriate material such as iron, and its one end is fitted to the upper side of the side sill cover 11 with appropriate combining means such as a bolt or rivet, and the other end is fitted to the portion beneath the step 19 of the outer plate 18 which constitutes the side sill 16 by means of the combining means such as the above fastener. However, the shape of the bracket 15 and the like can be optional, and may be formed in one-piece with the side sill cover 11.

FIG. 3 shows a fitting structure in the intermediate part of the side spoiler 5. In this part, there is formed a fitting step part 20 bent upward to the tip side of the upper side part 9 of the side spoiler 5. With this fitting step part 20 adhesion is made to the upper side part 9 of the side spoiler 5 through the two-side adhesive tape 21.

This fitting step part 20 is inserted into the space formed between the step 19 of the side sill 16 and the side sill cover 11 by utilizing the space C formed between the pushed down side sill cover 11 and the lower end of the front door 1. Also, the fitting step part 20 is positioned at a place deeper than the front door 1 so as not to affect its opening/closing.

On the other hand, the lower side part 10 of the side spoiler 5 and the lower side part 13 of the side sill cover 11 are fastened into one-piece with a bolt 22 and a nut 23. The fitting structure on the rear half side of the side spoiler 5 is similar to it, the cross section of 1R—1R line showing the fitting structure at the rear side step part 7 beneath the rear fender 4 is approximately same as FIG. 1, and the cross section of 3R—3R line in the intermediate part beneath the rear door 2 is approximately same as FIG. 3.

Figure 4:
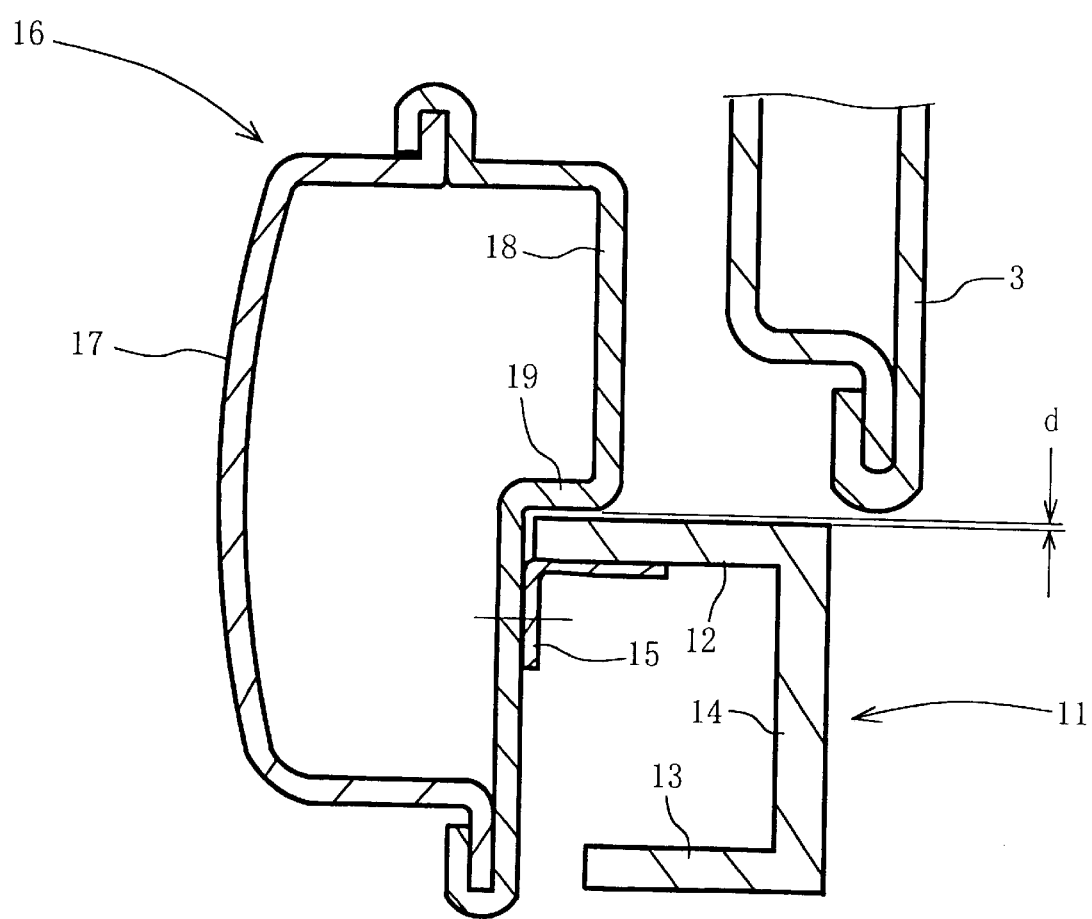
FIG. 4 is a section of the same position as that of FIG. 1 prior to the fitting of the side spoiler.

FIG. 4 shows the fitting condition of the side sill cover 11 before fitting the side spoiler 5 in the same cross sectional position as that of FIG. 1. As apparent in this figure, the upper side part 12 of the side sill cover 11 is in a condition of being in close contact with the step 19 with a slight gap d left. The heights of the lower end part of the front fender 3 and the step 19 show approximate agreement.

Next, the operation of this embodiment is explained. As shown in FIG. 4, under the condition in which the side sill cover 11 is fitted in advance, the tip part of each upper side 9 of the front side step 6 and the rear side step 7 is pushed into the lower part of the step 19 from the gap between each lower end of the front fender 3 and the rear fender 4 and the side sill cover 11.

Under such a state, the bracket 15 is deformed and the whole side sill cover 11 is pushed down to about the wall thickness of each upper side 9 in the front side step 6 and the rear side step 7 to present a condition of FIG. 1.

By this step, in the intermediate part in the lengthwise direction of the side sill cover 11 there is formed a gap C with the step 19 and each lower end of the front door 1 (rear door 2).

Accordingly, the upper side 9 of the side spoiler 5 is inserted from the outside of the vehicle body from the gap C, the fitting step 20 to which one side of the two-side adhesive tape 21 is adhered is pushed into the lower side of the step 19 to adhere to the upper side 12 of the side sill cover 11 with the two-side adhesive tape 21.

Next, the lower sides 10 and 13 of the side spoiler 5 and the side sill cover 11 are fastened with the bolt 22 and the nut 23 to fit the side spoiler 5 to the side sill cover 11 into one-piece.

The thus formed side spoiler 5 is rigidly supported, as it is possible to utilize the rigidity of the side sill cover 11 inside. Accordingly, the side spoiler 5 may just perform the role as an appearance surface, and not much rigidity is required. Accordingly, the side spoiler can be formed in a lightweight manner by using a relatively thin wall resin. Moreover, as vacuum molding can be utilized, forming is easy and cost is low.

Also, as the side sill cover 11 which is fitted in advance to the vehicle body side is utilized as it is, it is unnecessary to remove such member, and the work step for removal can be made unnecessary. Furthermore, while it is necessary to make disposal of the side sill cover 11 when removed, the labor of such disposal is unnecessary, and wasting of resource can be prevented.

Moreover, the fitting of the side spoiler 5 is made by inserting the front and rear end parts and intermediate part into the gap between the lower end parts of the front fender 3, rear fender 4 and each lower end part of the front door 1 and the rear door 2 and the side seal cover 11, so that the appearance of the fitting part to the vehicle body on the upper side 9 of the side spoiler 5 is improved.

Furthermore, the fitting is made by the adhesion by the two-side adhesive tape 21 on the reverse face of the upper side 9 and the fastening with the bolt 22 and the nut 23 at the lower side part 10, so that the fitting part is not viewed from outside, and as a result, the appearance required for the side spoiler 5 can be improved.

The invention in application is not limited to the above embodiment but may be modified to various styles for application not only to the side spoiler but also to various armor parts such as door panel, front spoiler, rear spoiler, etc.

What is claimed is:

1. A combination of a spoiler and a vehicle, said combination comprising:

a vehicle including a body and a decorative covering member attached to said vehicle, said decorative covering member being located adjacent to said body; and a spoiler press fitted between said decorative covering member and said body, with said spoiler covering at least a portion of said decorative covering member, wherein said decorative covering member has a first substantially C-shaped cross section opening toward a center of said vehicle, and wherein said spoiler has a second substantially C-shaped cross section opening toward the center of said vehicle for overlaying said first substantially C-shaped cross section of said decorative covering member.

2. The combination according to claim 1, wherein said spoiler is formed of a resin material.

3. The combination according to claim 1, wherein said decorative covering member is formed of a metal material.

4. The combination according to claim 1, wherein said body includes a lower rear portion of a front fender of said vehicle.

5. The combination according to claim 1, further comprising:

an approximately L-shaped bracket attaching said decorative covering member to said vehicle, wherein said bracket is deformed in order to allow said spoiler to be press fitted between said decorative covering member and said body.

6. The combination according to claim 5, further comprising:

a double-sided adhesive tape disposed between an upper surface of an upper part of said decorative covering member and a lower surface of an upper part of said spoiler; and a bolt and nut passing through aligned holes in said spoiler and said decorative covering member, wherein said aligned holes include a through hole formed in a lower part of said decorative covering member and a through hole formed in a lower part of said spoiler.

7. The combination according to claim 6, wherein said spoiler is formed of a resin material and said decorative covering member is formed of a metal material.

8. A combination of a spoiler and a vehicle, said combination comprising:

a vehicle including a body and a decorative covering member attached to said vehicle, said decorative covering member being located adjacent to said body;

a spoiler press fitted between said decorative covering member and said body, with said spoiler covering at least a portion of said decorative covering member; and a fastener attaching said spoiler to said decorative covering member, wherein said fastener includes a double-sided adhesive tape.

9. The combination according to claim 8, wherein said decorative covering member has a first substantially C-shaped cross section opening toward a center of said vehicle.

10. The combination according to claim 8, wherein said double-sided adhesive tape is disposed between an upper surface of an upper part of said decorative covering member and a lower surface of an upper part of said spoiler.

11. The combination according to claim 1, wherein said fastener further includes a bolt and nut passing through aligned holes in said spoiler and said decorative covering member.

12. The combination according to claim 11, wherein said aligned holes include a through hole formed in a lower part of said decorative covering member and a through hole formed in a lower part of said spoiler.

13. The combination according to claim 12, wherein said double-sided adhesive tape is disposed between an upper surface of an upper part of said decorative covering member and a lower surface of an upper part of said spoiler.

14. The combination according to claim 8, wherein said spoiler is formed of a resin material.

15. The combination according to claim 8, wherein said decorative covering member is formed of a metal material.

16. The combination according to claim 8, wherein said body includes a lower rear portion of a front fender of said vehicle.

17. The combination according to claim 8, further comprising:

an approximately L-shaped bracket attaching said decorative covering member to said vehicle, wherein said bracket is deformed in order to allow said spoiler to be press fitted between said decorative covering member and said body.

18. The combination according to claim 17, further comprising:

a double-sided adhesive tape disposed between an upper surface of an upper part of said decorative covering member and a lower surface of an upper part of said spoiler; and a bolt and nut passing through aligned holes in said spoiler and said decorative covering member, wherein said aligned holes include a through hole formed in a lower part of said decorative covering member and a through hole formed in a lower part of said spoiler.

19. The combination according to claim 18, wherein said spoiler is formed of a resin material and said decorative covering member is formed of a metal material.

20. A combination of a spoiler and a vehicle, said combination comprising:

a vehicle including a body and a decorative covering member attached to said vehicle, said decorative covering member being located adjacent to said body;

a spoiler press fitted between said decorative covering member and said body, with said spoiler covering at least a portion of said decorative covering member; and an approximately L-shaped bracket attaching said decorative covering member to said vehicle, wherein said bracket is deformed in order to allow said spoiler to be press fitted between said decorative covering member and said body.

* * * * *